Nov. 3, 1925.

H. P. KRAFT

TIRE VALVE

Original Filed July 22, 1921

1,559,887

Inventor
Henry P. Kraft,
By his Attorneys
Fraser, Funk & Myers

Patented Nov. 3, 1925.

1,559,887

UNITED STATES PATENT OFFICE.

HENRY P. KRAFT, OF RIDGEWOOD, NEW JERSEY; EDGAR J. PHILLIPS AND EARL A. DARR EXECUTORS OF THE WILL OF SAID HENRY P. KRAFT, DECEASED.

TIRE VALVE.

Application filed July 22, 1921, Serial No. 486,812. Renewed January 5, 1924.

*To all whom it may concern:*

Be it known that I, HENRY P. KRAFT, a citizen of the United States of America, residing in Ridgewood, in the county of Bergen and State of New Jersey, have invented certain new and useful Improvements in Tire Valves, of which the following is a specification.

This invention relates to valves for tires or the like, and aims to provide certain improvements therein.

In the standard tire valve the so-called valve insides comprise a seat member, a screw-threaded plug swivelled to the seat member, a valve check, a valve spring beneath the check, and a spring holder beneath the spring, all of the parts being traversed by a pin, which extends to a point near the top of the valve casing and passes downwardly through the check, spring and spring cup.

According to the present invention the pin in so far as it extends above the check is replaced by a tubular member, either formed as a part of the check or connected therewith. This tubular member is of large diameter just sufficient to slide easily through the valve seat and swivelled plug. By this construction I am not only enabled to produce a precise guiding of the check against its seat, but I am also enabled to assist the screw plug and seat in keeping in alinement. Openings for the air are provided at the bottom of the tubular member, just above the check, the main body of the air passing down the tube during inflation until it reaches the openings, whereupon it passes out laterally. Conversely, during deflation, the air passes up alongside of the check and before it passes through the seat, its path is deflected laterally into the tube. By this means there is less tendency to strip the packing of the check from its seat.

Referring to the drawings, which illustrate several forms of the invention,—

Figure 1:
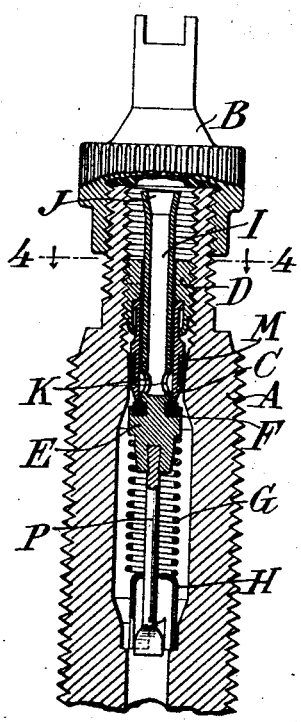
Figure 1 is a diametrical section of the upper part of a valve casing, showing the valve insides provided by the present invention.

Referring to the drawings, let A indicate the valve stem or casing of usual form, B the valve cap, C the valve seat and D the screw-threaded plug swivelled to the valve seat, E the valve check having a packing F, G the valve spring and H the spring cup.

Figure 2:
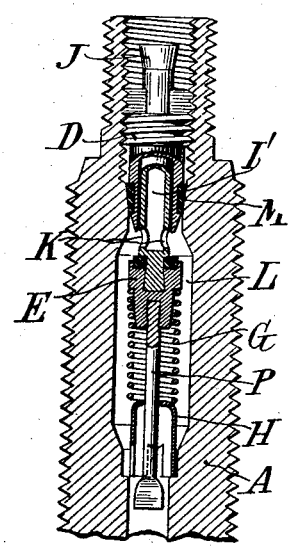
Fig. 2 is a similar view with a slight modification.
Figure 3:
Fig. 3 is an elevation of the check with its pin and tube detached.
Figure 4:
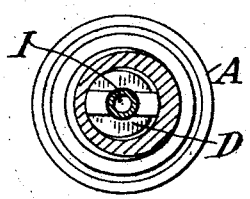
Fig. 4 is a cross-section on the line 4—4 in Fig. 1.
Figure 5:
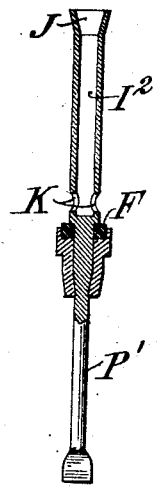
Fig. 5 is a sectional view of the check with its pin and tube detached, showing a modification.
Figure 6:
Fig. 6 is a plan of Fig. 5.

According to the present invention the valve check E has projecting from its upper side a tube I which is preferably formed with a slightly expanded mouth J. The tube I may be integrally connected with the valve check, as shown in Fig. 1, or it may be riveted therein, as shown in Fig. 2, or it may constitute a complete pin, as shown in Fig. 5. The tube is provided at its bottom with a hole or holes K, through which air passes into the chamber L when the valve is in its open condition, as shown in Fig. 2. The outside diameter of the tube is preferably a nice sliding fit with the bore of the plug D and seat C, so that the movements of the check up and down are well guided, and there is little liability of tilting or canting of the valve check on its seat. So also the swivelled connection between the plug D and the seat C is better guided so that the parts are enabled to keep more closely in alinement, while at the same time allowing for that looseness of connection which is necessary to produce a tight joint between the seat and the stem, by means of the packing M. It will be understood that in the making of valves by automatic machinery errors are bound to occur in the precise sizes of the parts, and these may be compensated for in order to produce a practical working structure in considerable quantities.

It will also be noted from an inspection of Fig. 2, which shows the position of the valve inside parts during the act of deflation, that the air under pressure coming out of the chamber L must turn rather sharply inward in order to pass through the apertures or holes K. This tends to lessen the liability of the packing M from stripping off its seat, since it tends to prevent the outcoming stream of air from exerting a powerful suction on the packing.

In Fig. 1 the check is provided on its lower side with a pin P which enters a recess in the check, the parts being swaged together. In Fig. 2 the tube I' is formed separately from the check, and connected therewith in a similar fashion. In Fig. 5 the tube I² and pin P' are formed in one and the same piece, the check being connected to the pin below the tube.

While I have shown and described one form of the invention, it will be understood that I do not wish to be limited thereto, since various changes may be made therein without departing from the spirit of the invention.

What I claim is:—

A top-repair valve inside unit for tire valves or the like, comprising a seat member, a screw-threaded plug, and a valve check, the seat member and plug having passages therethrough in alinement, the valve check having a tubular valve pin passing through said passages, and the top of said tubular pin being flared outwardly to a diameter larger than that of the passage through the plug.

In witness whereof, I have hereunto signed my name.

HENRY P. KRAFT.